Figure 1:
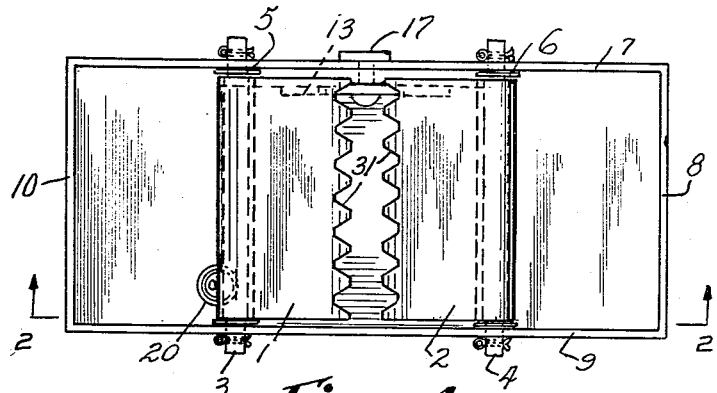

Sept. 10, 1957     C. G. LONG     2,805,513
ANIMAL TRAP
Filed March 9, 1953     2 Sheets-Sheet 1

INVENTOR.
Crawford G. Long
BY Chas. Lenegre
Attorney.

Sept. 10, 1957 C. G. LONG 2,805,513
ANIMAL TRAP
Filed March 9, 1953 2 Sheets-Sheet 2

INVENTOR.
Crawford G. Long
BY Chas. Denegre
Attorney.

2,805,513
ANIMAL TRAP

Crawford G. Long, Gardendale, Ala., assignor of one-half to G. W. Nicholson, Birmingham, Ala.

Application March 9, 1953, Serial No. 340,979

1 Claim. (Cl. 43—88)

This invention relates to an animal trap. It is especially intended for use in catching small animals, but its structure is such that it may be made in a size to catch a mouse or in a size to catch an elephant.

It has for its main objects to provide a trap that will be highly satisfactory for the purpose intended, simple in structure, comparatively cheap to manufacture, easy to set for use, and extremely durable.

Further objects are to provide a trap that will be humane in operation; that will not break the leg bones of animals; that will catch more than one animal at a time; that will make it very difficult for a caught animal to release itself by biting the held leg off as often done in the ordinary traps now in general use.

Other objects and advantages will appear from the drawing and description.

Figure 5:
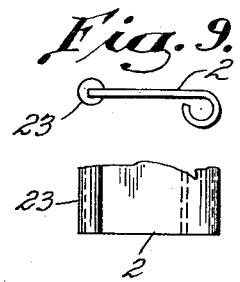
Figure 2:
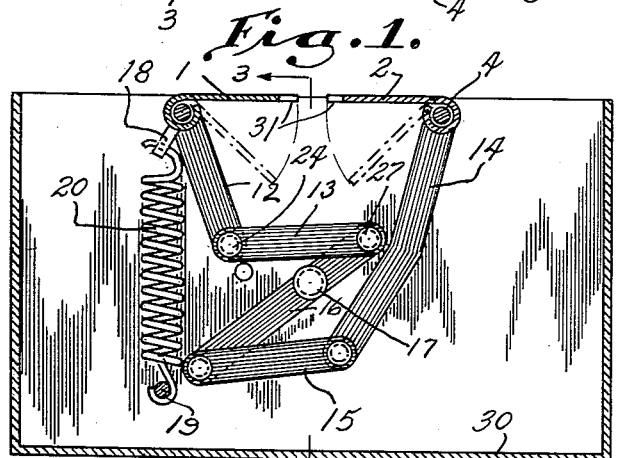
Figure 3:
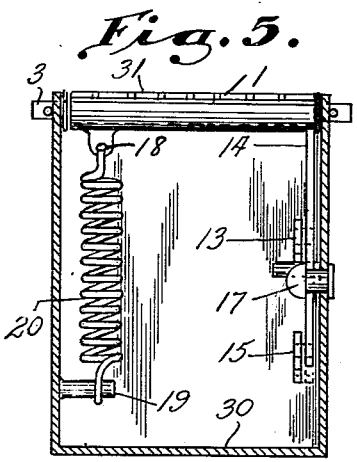
Figure 4:
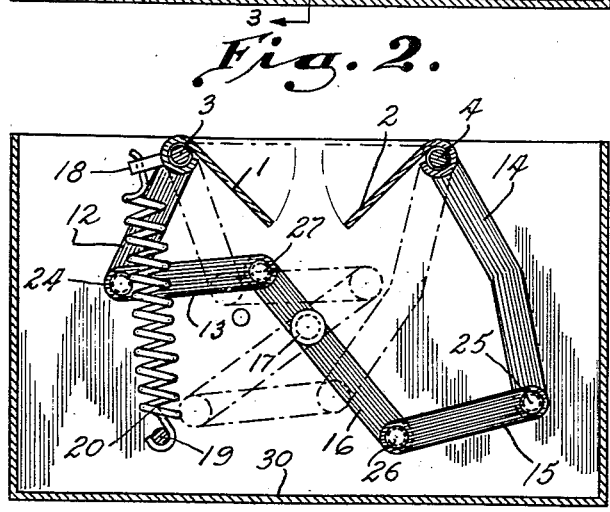
Figure 6:
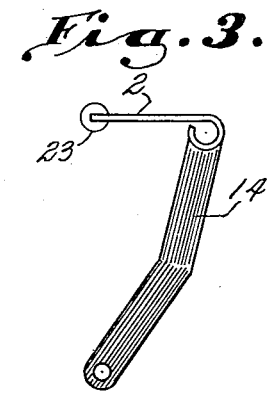
Figure 7:
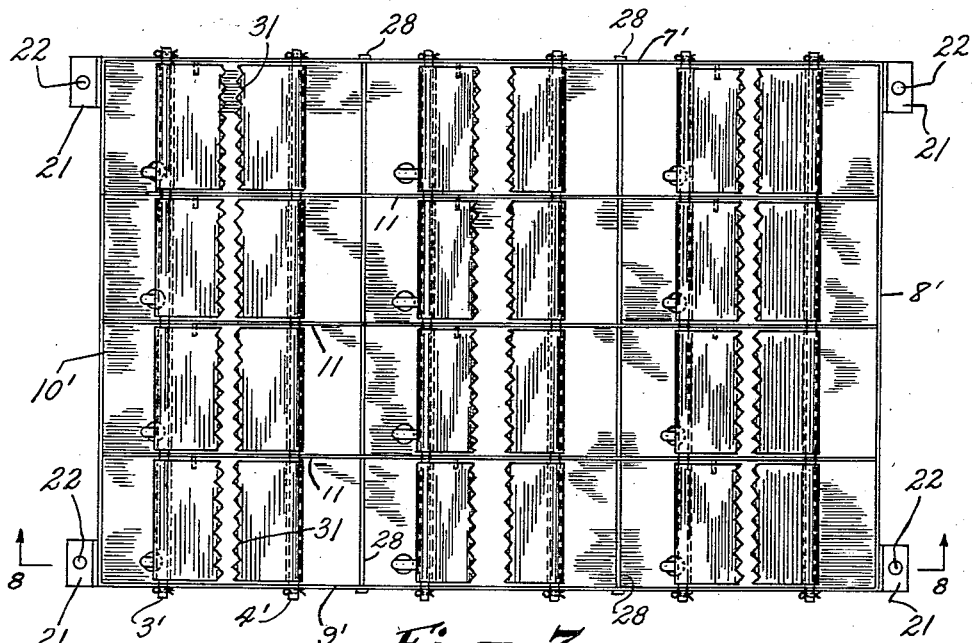
Figure 8:
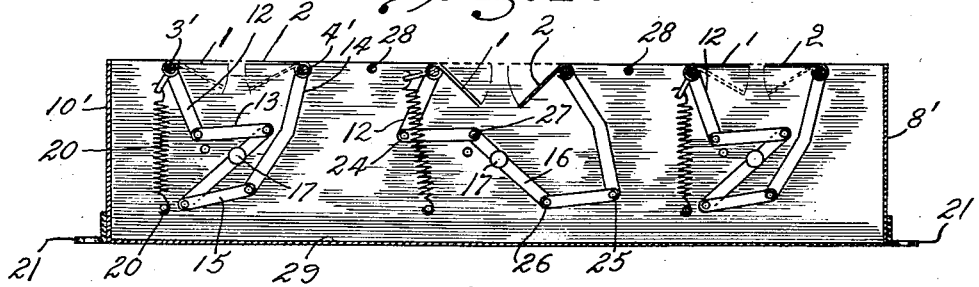

By referring generally to the drawings it will be observed that Fig. 1 is a plan view of a single trap made according to the present invention; Fig. 2 is a view on line 2—2 of Fig. 1; Fig. 3 is a sectional view on line 3—3 of Fig. 2; Fig. 4 is a view of the same parts shown in Fig. 2 but having the mechanism appearing in the position for its platforms to hold the leg of an animal; Fig. 5 is a detail view of a modification showing a platform having a rubber shield on its holding edge; Fig. 6 is a detail view showing a platform with its integral operating arm; Fig. 7 is a plan view showing a plurality of traps mounted in one container; Fig. 8 is a sectional view on line 8—8 of Fig. 7 showing the mechanism of the traps and Fig. 9 is an end view of Fig. 5.

Similar reference numerals refer to similar parts throughout the several views.

Referring to the drawing in detail it will be seen in Figs. 1 to 4, inclusive, that one form of the trap embodies an open top container or receptacle having a bottom wall 30 and side walls 7, 8, 9, and 10. A pair of shafts 3 and 4 extend between the side walls 7 and 9 and are supported in the side walls adjacent the top thereof by bearings 5 and 6. A pair of platforms 1 and 2 are pivotally connected to the shafts 3 and 4 respectively for limited swinging thereabout within the confines of the container. Platform 1 has an integral arm 12 depending therefrom, and the free end of the arm 12 is connected to one end of a connecting arm 13 by the pivot 24. Platform 2 has an integral arm 14 depending therefrom which is formed intermediate its ends with a bend providing sections each of which are substantially equal in length to the arm 12 of platform 1. A connecting arm 15 has one of its ends connected to the free end of the arm 14 by means of a pivot 25 and its other end connected to a cross arm 16 by pivot 26. The cross arm 16 is pivotally connected to the container by means of the stud shaft 17 secured to the central portion of the side wall 7, the end of the cross arm 16 opposite to its connection with arm 15 being connected to the free end of the arm 13 by pivot 27. Platform 1 is provided at one end with an integrally formed eye 18 adapted to receive one end of a coil spring 20 which has its other end secured to a stud 19 mounted on wall 9 of the container. Referring to Figs. 1 and 2, the platforms 1 and 2 are normally held in a horizontal plane at the top of the container by the spring 20 and are provided with serrated edges 31 positioned in opposed spaced relation.

A modified form of platform is illustrated in Figs. 5, 6, and 9, which is identical to the platform previously described except that the opposed edges of the modification are covered with a rubber element 23 instead of being serrated to thus do less damage to a leg of an animal held in the trap.

From the foregoing it will appear that when an animal's foot is placed upon either or both of the platforms 1 and 2 the same will be depressed against the tension of spring 20 to permit the leg to slide between the opposed edges of the platforms to be grasped by the serrations or rubber element as the case may be. The tension of the spring 20 when the platforms are depressed maintains the edges of the platforms in contact with the animal's leg and any attempt to withdraw the same will increase the clamping effect.

Referring to the form of the invention illustrated in Figs. 7 and 8, there is shown a plurality of trap mechanisms mounted in a single open top container for independent operation. The container comprises a bottom wall 29 and side walls 7', 8', 9', and 10'. Extending between the walls 8' and 10' are a plurality of spaced partitions 11 dividing the container into longitudinally extending compartments. An angle extension 21 is provided adjacent each corner of the container. Each of the extensions 21 has one leg thereof secured to the side wall 8' or 10' as the case may be while the other leg provides a foot having an aperture 22 therein for receiving an anchoring means such as a peg or chain to prevent removal of the trap by an animal caught therein. Support rods 28 extend horizontally through the partitions 11 adjacent the top thereof and are secured adjacent their ends to the side wall 7' and 9'. Pairs of horizontally spaced shafts 3' and 4' extend between the side walls 7' and 9' and through the partitions 11. A plurality of trapping mechanisms identical to the mechanism previously described in relation to Figs. 1 and 4, inclusive, are positioned in spaced relationship within the confines of the compartments in the container. Platforms 1 and 2 are pivotally secured to the shafts 3' and 4' respectively and the connecting links 12, 13, 14, 15 and 16 and the coil spring 20 are identical and are pivotally connected together as previously described.

The trap may be made of any material suitable for the purpose, but I prefer to use different kinds of metal. Also the trap may be made in different sizes and capacities depending on the size of animals to be caught.

While I have shown and described the preferred embodiment of my invention, I do not wish to limit the same to the exact and precise details of structure, but reserve the right to make all modifications and changes so long as they remain within the scope of the invention and the following claim.

Having described my invention I claim:

An animal trap of the character described comprising, a main container, said container being open at the top, and having four outer walls, and a plurality of partitions extending therebetween, a plurality of similar trapping mechanisms secured in said container, each of said mechanisms comprising a pair of platforms mounted swingably adjacent the open top on shafts supported in bearings in said walls and partitions with the free edges of each pair of platforms positioned near each other when the platforms are in alignment with each other, each platform having an integral arm extending downward with one arm being longer than the other, a stud shaft secured in the container, a cross arm mounted pivotally on said stud shaft, connecting arms connected pivotally to said cross arm and to said integral arms for each pair of platforms, an eye element attached integrally to one end of one platform of each pair, a stud bolt attached in the container and vertically spaced from said eye, and a coil spring, said spring having one end thereof attached in said eye with its other end attached to said stud bolt, said spring being set with contracting tension as means to maintain its adjacent pair of platforms in their normal aligned position and in the same plane as the fixed portions of the container top.

References Cited in the file of this patent

UNITED STATES PATENTS

| | | |
|---|---|---|
| 1,342,328 | Enos | June 1, 1920 |
| 1,475,871 | Phillips | Nov. 27, 1923 |
| 2,123,955 | Oberle | July 19, 1938 |
| 2,146,464 | Briddell | Feb. 7, 1939 |